(12) United States Patent
Morris et al.

(10) Patent No.: US 7,574,479 B2
(45) Date of Patent: Aug. 11, 2009

(54) TECHNIQUES FOR ATTESTING TO CONTENT

(75) Inventors: Cameron Craig Morris, Saratoga Springs, UT (US); Lloyd Leon Burch, Payson, UT (US); Stephen R. Carter, Spanish Fork, UT (US); Stephen Hugh Kinser, Saratoga Springs, UT (US)

(73) Assignee: Novell, Inc., Provo, UT (US)

( * ) Notice: Subject to any disclaimer, the term of this patent is extended or adjusted under 35 U.S.C. 154(b) by 633 days.

(21) Appl. No.: 11/338,393

(22) Filed: Jan. 24, 2006

(65) Prior Publication Data

US 2007/0174406 A1 Jul. 26, 2007

(51) Int. Cl.
*G06F 15/16* (2006.01)
(52) U.S. Cl. .......................... 709/207; 713/181
(58) Field of Classification Search ......... 709/200–207; 713/155, 156, 176, 180, 181, 182, 161–166
See application file for complete search history.

(56) References Cited

U.S. PATENT DOCUMENTS

| | | | |
|---|---|---|---|
| 4,568,936 A | 2/1986 | Goldman | |
| 4,686,527 A | 8/1987 | Goldman | |
| 4,689,477 A | 8/1987 | Goldman | |
| 5,497,422 A * | 3/1996 | Tysen et al. | 713/157 |
| 5,638,446 A * | 6/1997 | Rubin | 705/51 |
| 6,009,173 A * | 12/1999 | Sumner | 713/156 |
| 6,161,181 A * | 12/2000 | Haynes et al. | 713/170 |
| 6,393,566 B1 | 5/2002 | Levine | |
| 6,430,688 B1 * | 8/2002 | Kohl et al. | 713/156 |
| 6,460,138 B1 * | 10/2002 | Morris | 713/184 |
| 6,658,598 B1 | 12/2003 | Sullivan | |
| 6,848,048 B1 | 1/2005 | Holmes | |
| 7,024,562 B1 * | 4/2006 | Flink et al. | 713/186 |
| 7,039,810 B1 * | 5/2006 | Nichols | 713/182 |
| 7,188,362 B2 * | 3/2007 | Brandys | 726/9 |
| 7,380,126 B2 * | 5/2008 | Logan et al. | 713/176 |
| 2002/0027523 A1 | 3/2002 | Muramatsu et al. | |
| 2002/0059364 A1 | 5/2002 | Coulthard et al. | |
| 2002/0164047 A1 | 11/2002 | Yuval | |
| 2002/0181703 A1 * | 12/2002 | Logan et al. | 380/30 |
| 2002/0186838 A1 * | 12/2002 | Brandys | 380/30 |
| 2003/0158823 A1 | 8/2003 | Fulton et al. | |
| 2004/0139352 A1 | 7/2004 | Shewchuk et al. | |
| 2004/0148356 A1 * | 7/2004 | Bishop et al. | 709/206 |
| 2004/0243678 A1 * | 12/2004 | Smith | 709/206 |
| 2005/0066169 A1 | 3/2005 | Kiehtreiber et al. | |
| 2005/0086504 A1 | 4/2005 | You et al. | |
| 2005/0198170 A1 * | 9/2005 | LeMay et al. | 709/206 |

(Continued)

OTHER PUBLICATIONS

"European Application Serial No. 07 100 377.6 1245 dated Jun. 13, 2008", 4 pgs.

*Primary Examiner*—Moustafa M Meky
(74) *Attorney, Agent, or Firm*—Schwegman, Lundberg & Woessner, P.A.

(57) ABSTRACT

Techniques for attesting to content received from an author (sender) are provided. A sender's content is represented by a message digest. The message digest is signed by an identity service. The signed message digest represents an attestation as to the authenticity of the content from the sender. The sender transmits the signed message digest and content in a message to a recipient. The recipient verifies the signature and message digest to authenticate the content from the sender.

25 Claims, 4 Drawing Sheets

U.S. PATENT DOCUMENTS

2005/0251682 A1    11/2005  Collins et al.
2005/0257057 A1*   11/2005  Ivanov et al. ............... 713/171
2005/0262552 A1*   11/2005  Brown et al. ................ 726/10
2006/0064581 A1*   3/2006   Miller et al. ................ 713/156
2006/0101271 A1*   5/2006   Thomas ...................... 713/180
2006/0123476 A1*   6/2006   Yaghmour ................... 726/22

* cited by examiner

TECHNIQUES FOR ATTESTING TO CONTENT

FIELD

The invention relates generally to security and more particularly to techniques for attesting to content received from an author (sender) over a network.

BACKGROUND

Increasingly more and more communication is occurring via the Internet. Electronic mail (email) is now a desired form of communication with most individuals and enterprises. Moreover, instant messaging, text messaging, and on-line chat forums are growing exponentially in their popularities. With these electronic communications, there are growing and crying needs for an improved ability to certify the authorship of content that is included with a message.

Email is a good example of the need to certify authorship of content. Consider that an average email user may receive tens or hundreds of emails daily. Some of the senders of these emails may appear to be known to the recipient, but because of the ease of spoofing the "From" field of an email, the email may not actually have originated from the sender that the recipient believes it to have come from. In addition, and even without spoofing, the average user may receive scores of emails from unknown sources on a daily basis, some of which the user may be interested in reading. These emails from spoofed known users and from unknown users are the basis of many virus attacks and provide the mechanism through which virus attacks are propagated.

The concept of securing email has been discussed, but it has not been implemented due to the overhead associated with managing the necessary certificates, which it is believed that such a deploying technology would require. The result is that secure email has been very limited in its deployment, and spammers and phishers continue to abound on the Internet.

Therefore, there is a need for techniques that attest to an author's content for purposes of verifying the content from that author (sender).

SUMMARY

In various embodiments, techniques for attesting to content are presented. More specifically, and in an embodiment, a method for attesting to content is provided. Content is received in a message from a sender. A signed version of a message digest for the content is acquired from the message and the signed version of the message digest is attempted to be validated. In response to the validating, an appropriate policy is processed.

DETAILED DESCRIPTION

Figure 1:
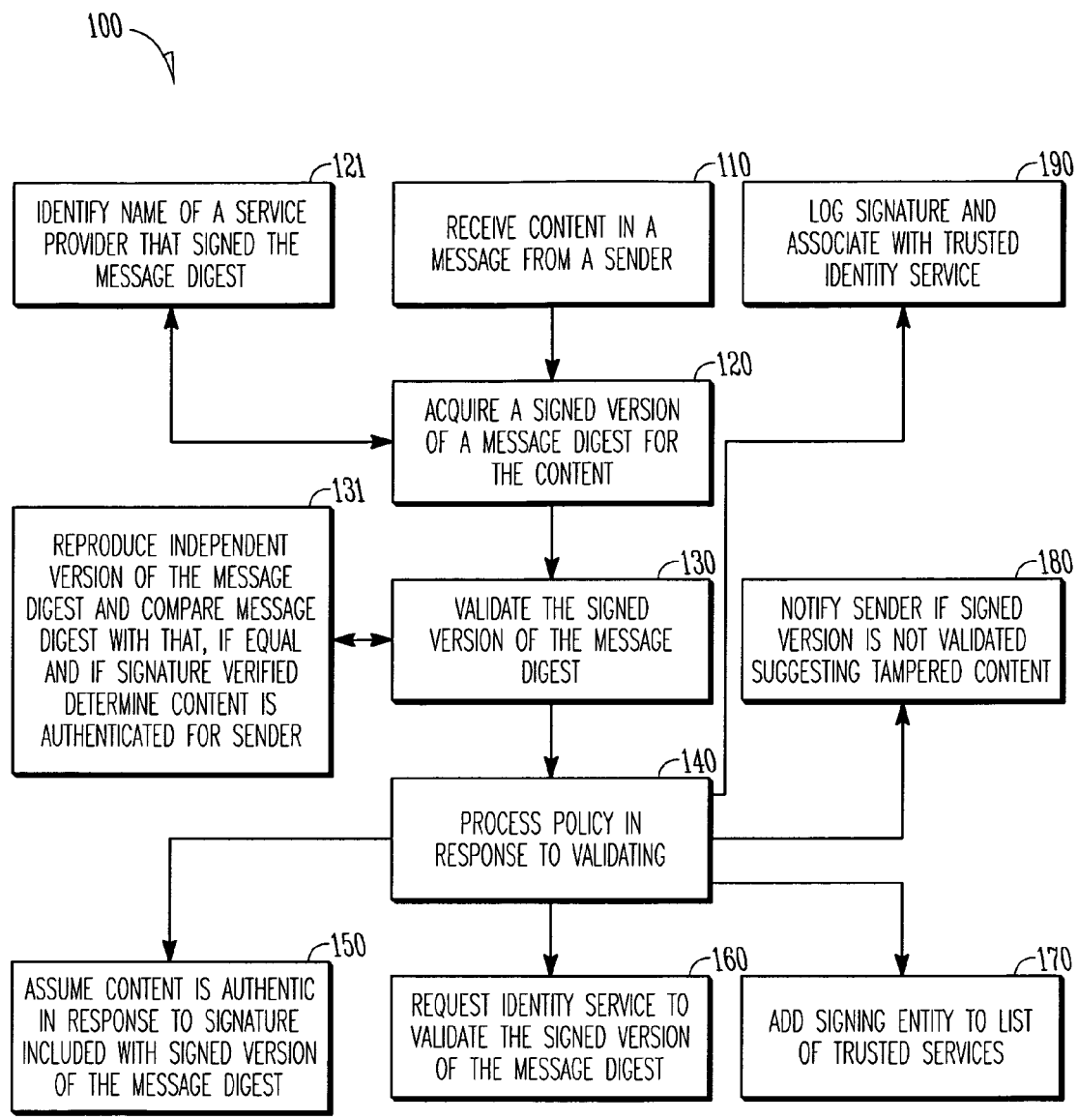
FIG. 1 is a diagram of a method for verifying content that has been attested to, according to an example embodiment.

A "resource" includes a user, service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A sender and a recipient are special types of resources. A sender (which may also be referred to as an author of content herein and below) constructs messages that have content and sends or transmits them over a network to one or more recipients. Again, a sender may become a recipient and vice versa depending upon the context of a transaction.

Another type of resource discussed herein is an identity service. The identity service can perform a variety of beneficial functions. Some example identity services may be found at U.S. patent application Ser. No. 10/765,523 entitled "Techniques for Dynamically Establishing and Managing Authentication and Trust Relationships;" at U.S. patent application Ser. No. 10/767,884 entitled "Techniques for Establishing and Managing a Distributed Credential Store;" and at U.S. patent application Ser. No. 10/770,677 entitled "Techniques for Dynamically Establishing and Managing Trust Relationships." All of these are incorporated herein by reference.

The identity service discussed herein and below augments these existing identity services with yet more beneficial features that provide an attestation mechanism for content of a sender and, optionally, a verification service for recipients of content. This will be discussed in greater detail below.

Content is embodied in a message and transmitted over a network from senders to recipients or receivers. The message may be in a variety of formats, such as but not limited to, Multipurpose Internet Mail Extensions (MIME), Secure MIME, (S/MIME), Extensible Markup Language (XML), Standardized Generalization Markup Language (SGML), Really Simple Syndication (RSS), Transmission Control Protocol (TCP), and others.

A message includes content plus other metadata. Some example enhanced metadata, which is discussed herein and below, is referred to as an Authorship Attestation Certification (AAC). As will be detailed below, an AAC may include a signature of an identity service and a message digest for content of a message. The AAC serves as an attestation as to the authenticity of content sent from a sender and received by a recipient.

Various embodiments of this invention can be implemented in existing network architectures. For example, in some embodiments, the techniques presented herein are implemented in whole or in part in the Novelle® network and proxy server products, email products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for verifying content that has been attested to, according to an example embodiment. The method 100 (hereinafter "recipient service") is implemented in a machine-accessible and readable medium. The recipient service is operational over and processes within a network. The network may be wired, wireless, or a combination of wired and wireless.

The processing of the recipient service occurs after a piece of content has been attested to by an identity service or by a trusted third-party and the signature of the attestation service is included within a message digest of the content within the message. The recipient service receives the message, and the message includes the content, a signed version of the message digest and perhaps other metadata, as will be discussed below.

At 110, the recipient service receives content in a message from a sender (author). Before the content is opened for viewing or consumption by a recipient, the recipient service inspects the message to separate and segment the signed version of a message digest from the content.

Accordingly, at 120, the recipient service acquires the signed version of the message digest for the content from the received message. In an embodiment, the message may also include other metadata that may prove useful to the recipient service. For example, at 121, the recipient service may identify a name of the service provider that signed the message digest. Other information may also be included within the metadata, such as usage limitations with respect to the content of the message. So as an example, if the content is intellectual property, such as an image, music, or a video, then the usage limitations may restrict simultaneous viewing or prevent copying of the content.

At 130, the recipient service validates the signed version of the message digest for purposes of authenticating the content from the sender. This may be done in a variety of manners using a signature associated with the content and the message digest included with the content.

For example, at 131, the recipient service may generate its own independent message digest from the included message. If this independent message digest is equal to the included message digest with the message, then the recipient service may at least assume that the content has not been tampered with from how it was originally produced from the sender.

However, the content may not have originated from the sender that it is purported to be coming from, which may indicate that the content is being feigned. Thus, the recipient service may also verify the signature associated with the message digest. If the signature is associated with a known trusted third party signing or identity service, then the signature and the message digest combine to attest to the authenticity of the content from the sender. If the signature is unknown or encountered for a first time, then the recipient service may enlist the signing service or another trusted identity service to assist in verifying the signature.

At 140, the recipient service processes one or more policies in response to attempting to validate the signed version of the message digest. Policies may be processed if validation was successful and policies may be processed if validation was unsuccessful. Some example policies that may be processed are now described. It should be noted that virtually any desired processing may be associated with a validated or not validated signed version of a message digest from a sender. Thus, any conceivable and desired policy processing is intended to be included with the embodiments discussed herein.

According to an embodiment, at 150, the recipient service may assume that the content is authentic and from the purported sender in response to the signature. That is, the signature is associated with a known and trusted identity service of the recipient service and is known to the recipient service. Therefore, the mere presence of the signature from that trusted identity service serves as an attestation that the content is from the purported sender.

In another embodiment, at 160, policy may dictate that if the signature is from an unknown party to the recipient service, then the recipient service may request the identity service associated with the signature to verify the signature of the message digest. In some cases, the recipient service may request that a different and known identity service act on its behalf in acquiring a verification of the signature. That is, the different identity service may know and interact with the signing identity service, such that if the recipient service request assistance from the different identity service that it trusts, the recipient service can acquire a determination as to whether the signature associated with the message digest is legitimate or not legitimate.

In some cases, at 170, the recipient service may add the signing entity and its signature, which is acquired from the signed version of the message digest, to a list of trusted and valid signing services, if the recipient service is able to verify the signature. This permits the recipient service to more readily process and authenticate content from senders in the future if these messages include a previously validated signature from a known and trusted signing service.

In yet other embodiments, at 180, the recipient service may not be able to verify the content and/or the identity of the purported sender. In such a situation, the recipient service may notify the sender or purported sender that the message, which was sent to the recipient service, is being rejected because it cannot be authenticated. If the sender was legitimate, then this may suggest to the sender that a message was feigned on its behalf or that a legitimate message was tampered with by a man-in-the-middle. The sender may then more closely monitor its message transmissions to discover the root problem and may again attempt to send the message, assuming the message was in fact legitimate.

The policy that is processed may be identified within the recipient service's environment or may be identified for the recipient service via other metadata included with the message digest. Moreover, the recipient process may configure the policies to provide unique processing in response to a particular sender. For example, unique graphics or effects may be used to identify messages that authenticated from a particular sender. These unique graphics and/or effects may be displayed in a header or abbreviate view of the message in a list of unopened messages. As another example, authenticated messages from a particular sender may be routed to a designated mail inbox folder.

The processing of the recipient service reflects processing of a recipient that receives a message having content. The content includes a signed message digest, which the recipient processes to determine if the content from the sender is authentic or not. Policy may be processed automatically by the recipient service in response to the evaluation of the signed message digest.

Figure 2:
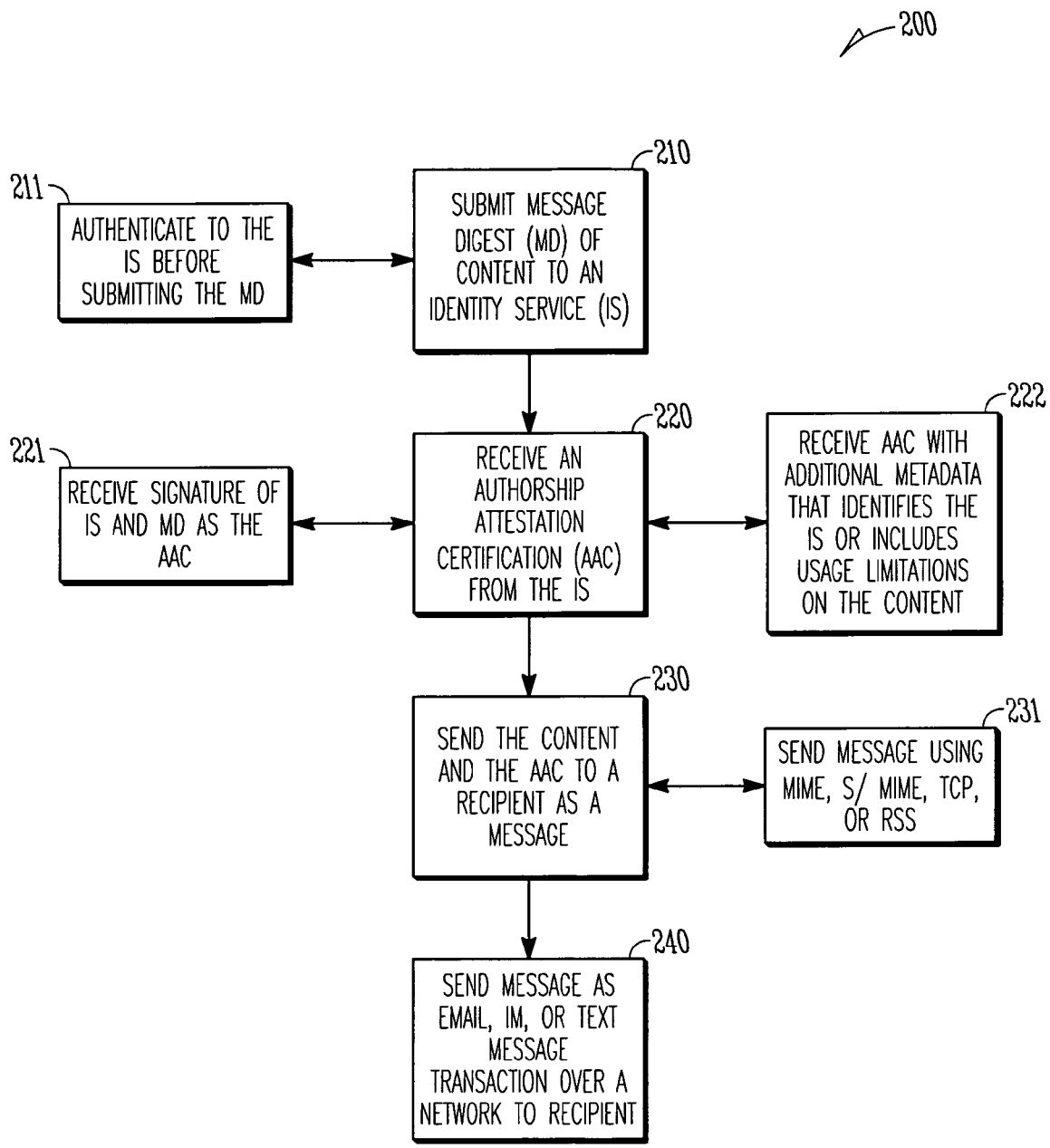
FIG. 2 is a diagram of method for requesting content that is attested to, according to an example embodiment.

FIG. 2 is a diagram of method 200 for requesting content that is attested to, according to an example embodiment. The method 200 (hereinafter "author service" is implemented in a machine-accessible and readable medium and is operational over a network. The network may be wired, wireless, or a combination of wired and wireless. In an embodiment, the author service provides the message having the content with the signed message digest to the recipient service represented by the method 100 of the FIG. 1.

Initially, the sender service, which is acting on behalf of a sender of a message, desires to send some content via a message to a recipient. In advance of sending that message, the sender service contacts and interacts with an identity service in the manners discussed below.

Before contacting the identity service, the sender service generates a message digest from the desired content associated with the message. The message digest is a hash of the content to produce a string or number; the hash can be reproduced by other services executing the same function with the same content. The message digest is used to verify that the content of the message has not been tampered with, but it does not also verify the author of the content or the sender. For this, the identity service is enlisted for assistance.

Accordingly, at 210, the sender service submits the message digest of the content to an identity service. It is noted, that at 211, the sender service may first authenticate itself to the identity service before the message digest is submitted to the identity service for processing.

In response to authenticating itself to an identity service and submitting the message digest for content of a desired message, the sender service receives from the identity service an Authorship Attestation Certification (AAC). The AAC is a signed version of the message digest. That is, at 221, the AAC includes a signature of the identity service with the originally submitted message digest.

According to an embodiment, at 222, the sender service may also receive other metadata with the AAC. For example, the metadata may identify the identity service; this may prove helpful to any recipient of the message if that recipient has not dealt with the identity service before and lacks a valid signature for the identity service. The metadata may also include attributes associated with the sender or may include usage limitations associated with the content of the message. In some cases, the metadata may also include policies or policy identifiers that the recipient is to adhere to when receiving the content.

At 230, the sender service then sends the AAC and content as a message to one or more desired recipients. At 231, the message may be sent using a variety of protocols, such as but not limited to, MIME, S/MIME, TCP, RSS, etc. Moreover, the format of the message may be in XML, SGML, Hypertext Markup Language (HTML), etc.

Furthermore, at 240, the sender service may send the message as an email, an IM, or a text message over a network to one or more recipients. So, the message may be received in a variety of message clients using a variety of different network protocols or network transport mechanisms and when the recipient(s) receive(s) the message, the processing discussed above with respect to the recipient service represented by the method 100 of the FIG. 1 is processed for purposes of verifying the signed message digest to attest to the authenticity of the content from the sender.

Figure 3:
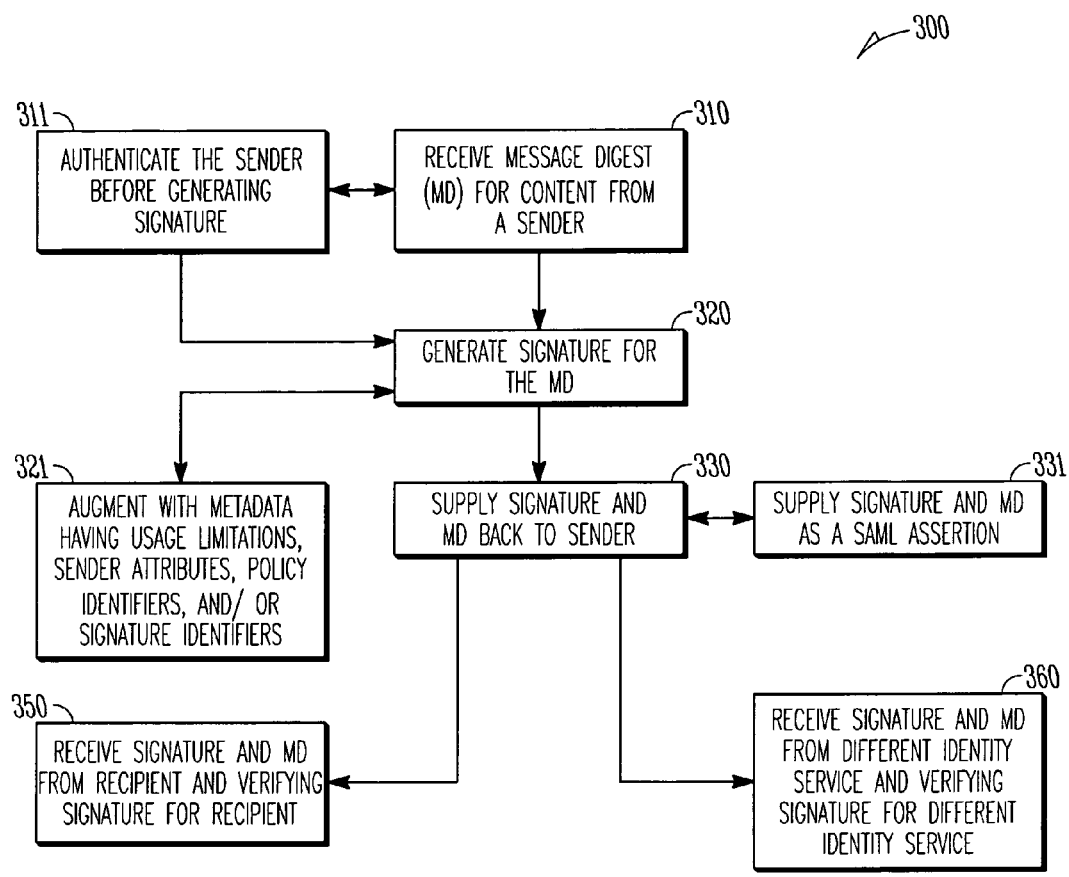
FIG. 3 is a diagram of a method for providing an attestation to content from an author (sender), according to an example embodiment.

While FIG. 1 discusses how an attested piece of content is authenticated or relied upon for authenticity and while FIG. 2 discusses how an author or sender initially constructs a message having information that attest to its content, FIG. 3 discusses the identity service that generates that information (e.g., signed message digest for content of a sender) for a sender and optionally verifies it for a recipient.

FIG. 3 is a diagram of a method 300 for providing an attestation to content from an author (sender), according to an example embodiment. The method 300 (hereinafter "identity service" is implemented in a machine-accessible and readable medium and is operational over a network. The network may be wired, wireless, or a combination of wired and wireless. In an embodiment, the identity service generates the signed message digest for sender service represented by the method 200 of the FIG. 2 and in some cases validates the signed message digest on behalf of the recipient service represented by the method 100 of the FIG. 1.

The identity service interacts with senders via a sender service, such as the one depicted above with respect to the method 200 of the FIG. 2, for purposes of attesting to content of messages being sent from the senders to recipients. In some embodiments, the identity service may also interact with receivers via a receiver service, such as the one depicted above with respect to the method 100 of the FIG. 1, for purposes of verifying a signature associated with a signed version of a message digest received with content of a message from a sender.

At 310, the identity service, receives a message digest for content from a sender. The sender is the author of the content. At 311, the identity service may have previously authenticated the sender before it attempts to generate a signature for the message digest.

According to an embodiment, the identity service may also generate the message digest on behalf of the sender. In such an embodiment, the content of the desired message that is being sent from the sender to one or more recipients is received by the identity service. Thus, the identity service may be used to generate the message digest from the content in some embodiments.

At 320, the identity service generates a signature for the message digest. That signature attest to the authenticity of the content and the sender or author associated with the content by the mere fact that the identity service has signed and vouched for its authenticity.

That is, the identity service is a trusted and reliable third-party known to the sender and knowable to the recipient. So, the identity service may be known in advance by a recipient of the message or may become known via another mechanism to the recipient. Another mechanism may include a situation where the recipient enlists the services of a different identity service, to which it knows and trusts to vouch for the identity service. Once known by the recipient, the identity service and its signature may be relied upon for future messages that include it.

According to an embodiment, at 321, the signed message digest may also be augmented with other metadata. This other metadata may include, by way of example only, usage limitations, sender attributes, policy identifiers, signature identifiers that identify the identity service, and the like. The other metadata may prove useful to the recipient of the message having the content with the identity service's signed message digest. A variety of examples of how this metadata may prove useful were provided above with respect to the recipient service represented by the method 100 of the FIG. 1. It should be noted that the identity service may receive the entire content from the sender and generate its own message digest that is signed and supplied to the sender.

At 320, the identity service supplies the signature and message digest (signed version of the message digest) back to the sender. The sender then sends the signed version of the message digest and the content to one or more recipients for consumption. Examples of processing associated with the sender were provided above with respect to the sender service represented by the method 200 of the FIG. 2.

In an embodiment, the signed message digest may be supplied back to the sender as an assertion in a Security Assertion Markup Language (SAML) format. The assertion may be used by the sender to attest to the authenticity of the content and the sender who sends the content via a message to one or more recipients.

In some embodiments, at 350, the identity service may subsequently receive the signed message digest from a recipient that acquires the content from a sender having the signed message digest. In response to this, the identity service verifies its own signature on behalf of the recipient.

In other situations, at 360, the identity service may receive the signed message digest from a different identity service enlisted by the recipient on the recipient's behalf. That different identity service may present the signature to the identity service for verification and the identity service verifies it for that different identity service. The different identity service then notifies the recipient that the signature is authenticated and that the content from the purported sender may be relied upon.

The identity service is a trusted-third party service that signs and vouches for message digests associated with content of messages being sent from senders. The processing associated with the senders was presented and discussed in detail above with respect to the method 200 of the FIG. 2. The processing associated with the recipients that receive the messages was discussed in detail above with respect to the method 100 of the FIG. 1.

It is now understood how content may be attested to and authenticated on the bases of that authentication in a manner that is easily implemented. This permits content of messages and the senders of those messages to be authenticated, which may be used for a variety of beneficial purposes, such as but not limited to, detecting spoofed messages, performing special and configured processing on the basis of validated messages from a specific sender, or performing special and configured processing on the basis of non validated messages.

Figure 4:
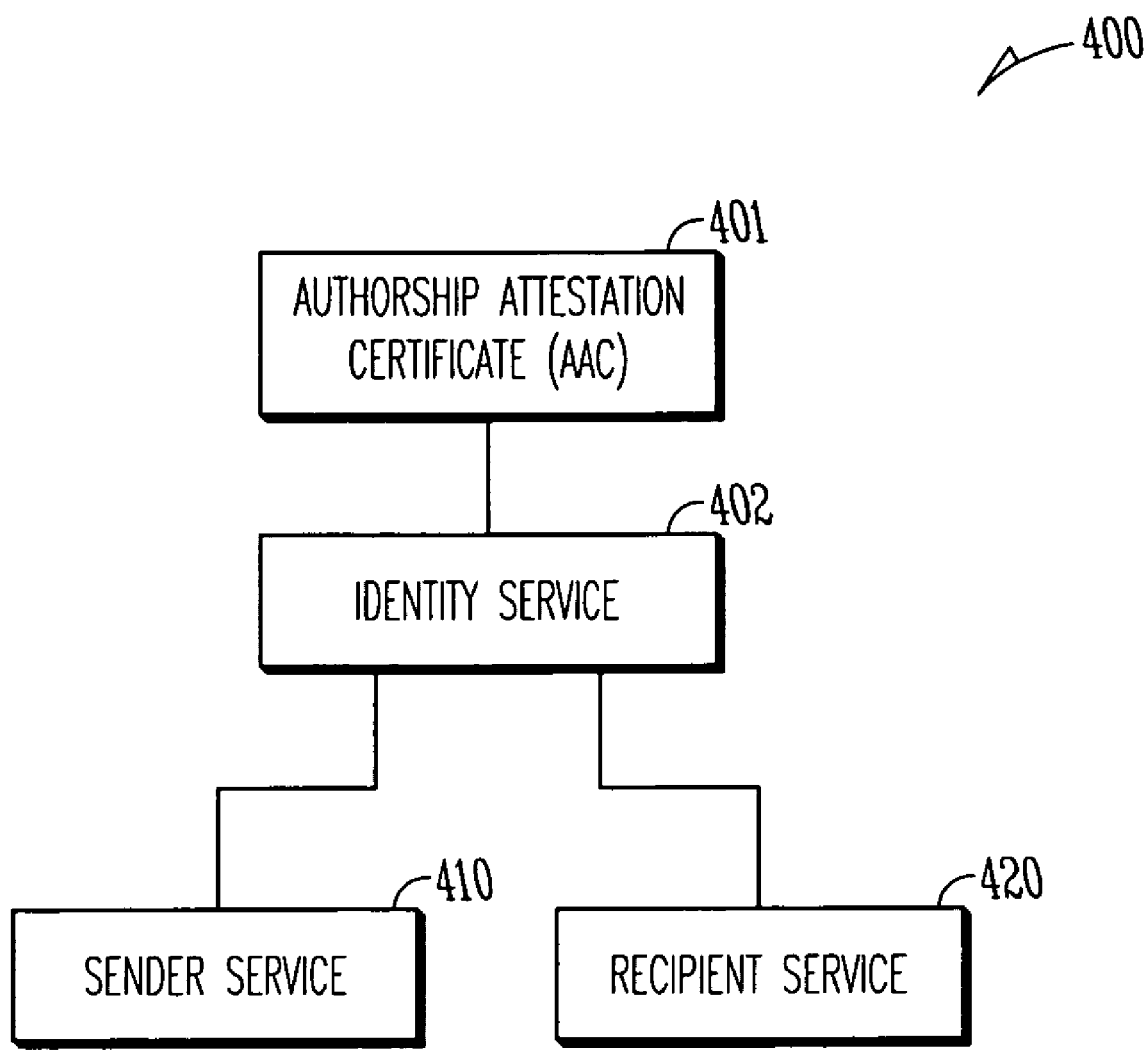
FIG. 4 is a diagram of a content attestation system, according to an example embodiment.

FIG. 4 is a diagram of a content attestation system 400, according to an example embodiment. The content attestation system 400 is implemented in a machine-accessible and readable medium and is accessed and processed over a network. The network may be wired, wireless, or a combination of wired and wireless. The content attestation system 400 implements, among other things, the identity service represented by the method 300 of the FIG. 3 and interacts with the sender service represented by the method 200 of the FIG. 2 and the recipient service represented by the method 100 of the FIG. 1.

The content attestation system 400 includes an AAC 401 and an identity service 402. The identity service 402 interacts with a sender service 410 and, optionally, a receiver service 420. Each of these will now be discussed in turn.

The AAC 401 is a signed version of a message digest for content of a message. The message digest may be submitted by the sender service 410 on behalf of a sender to the identity service 402 or in some cases, the identity service 402 may generate the message digest from content supplied by the sender service 410. The message digest is a hash of the content associated with the message. The signed message digest is a version of the message digest that includes a signature of the identity service 402.

The AAC 401 accompanies the content of a message when transmitted from a sender service 410 to a receiver service 420. In some embodiments, the AAC 401 may also be augmented with additional metadata, such as but not limited to usage limitations associated with the content, policy identifiers, identifiers associated with identifying the identity service 402, sender attributes, etc.

According to an embodiment, the AAC 401 may also be represented as an assertion. The assertion may be in a standardized assertion language, such as but not limited to SAML. The assertion accompanies the content of a message and may be relied upon by the recipient service 420 if the recipient service 402 recognizes the identity service 402. The presence of the assertion attests to the authenticity of the content from the sender.

The identity service 402 interacts with the sender service 410 to generate instances of the AAC's 401 for different content and different messages of the sender service. The identity service 402 also supplies the AAC 401 to the sender service 410 for use with message sending to the recipient service.

The identity service 402 may also serve as a verifier of its own AAC 401 for a recipient service 420. That is, a recipient service 420 may request that the identity service 402 verify the AAC 401 included with content of a message.

In some embodiments, the identity service 402 may indirectly serve as a verifier of its own AAC 401 for a trusted and different identity service associated with the recipient service 420. So, the recipient service 420 may use a third-party to contact the identity service 402 to verify the AAC 401.

The sender service 401 may represent and send the AAC 401 with a message in a variety of manners. For example, the AAC 401 may be represented within tagged information associated with a message sent via MIME, S/MIME, RSS, TCP, etc. Furthermore, the AAC 401 may be in any data format, such as XML, HTML, SGML, etc. Moreover, the message itself may be associated with an email, an IM, a text message, an on-line chat communication, etc.

It is now understood how content associated with a message may be seamlessly attested to and subsequently authenticated for the content of a particular sender. This streamlined technique presents a practical approach to authenticating content in a highly diverse environment, such as the Internet.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method implemented in a computer-readable medium and to execute on a computer for performing the method, comprising:
   receiving content in a message from a sender;
   acquiring a signed version of a message digest for the content, wherein the signed version was signed by an identity service on behalf of the sender indicating that content of the message was attested to by the identity service via the signature, a presence of the signature from the identity service serves as an attestation that the content is from the sender;
   validating the signed version of the message digest; and
   processing policy in response to validating the signed version of the message digest.

2. The method of claim 1, wherein acquiring further includes identifying a name of a service provider that provided the signed version of the message digest from metadata associated with the message digest.

3. The method of claim 1, wherein validating further includes reproducing an independent version of the message digest and comparing that independent version to the acquired version, and if equal and if a signature associated with the signed message digest is verified, then determining the content from the sender is authenticated.

4. The method of claim 1 further comprising, requesting a different identity service to assist in validating the signed version of the message digest, wherein the different identity service interacts with the identity service that originally signed the message digest on behalf of the sender.

5. The method of claim 1, wherein processing policy further includes adding the identity service associated with the signature of the signed version of the message digest to a list of trusted identity services after the signed version of the message digest is validated.

6. The method of claim 1, wherein processing policy further includes notifying a sender if the signed version of the message digest is not validated indicating the content has been tampered with.

7. The method of claim 1, wherein processing policy further includes logging the signature.

8. A computer-implemented method implemented in a computer-readable medium and to execute on a computer for performing the method, comprising:
submitting content to an identity service, wherein the identity service generates and supplies a message digest for the content;
receiving an authorship attestation certification (AAC) from the identity service for the content, the AAC includes a signature of the identity service along with the message digest; and
sending the content and the AAC to a recipient as a message.

9. The method of claim 8 further comprising, authenticating to the identity service before submitting the content.

10. The method of claim 8 further comprising, sending the message using a protocol associated with at least one of Multipurpose Internet Mail Extension (MIME), Secure MIME (S/MIME), Transmission Control Protocol (TCP), and Really Simple Syndication (RSS).

11. The method of claim 8 further comprising, sending the message as at least one of an electronic mail (email) transaction, an instant messaging (IM) transaction, and a text message transaction.

12. The method of claim 8, wherein receiving further includes receiving the AAC with additional metadata that includes usage limitations for the content.

13. A computer-implemented method implemented in a computer-readable medium and to execute on a computer for performing the method, comprising:
receiving content from a sender, and generating a message digest from the content;
generating a signature for the message digest, the signature provided on behalf of the sender to verify that the sender created the content and the signature is for an identity service acting on behalf of sender;
supplying the signature and the message digest back to the sender, wherein the sender uses the message digest and the signature to attest to the authenticity of the content as being from the sender via the signature of the identity service.

14. The method of claim 13 further comprising, authenticating the sender before receiving the message digest.

15. The method of claim 13 further comprising, augmenting the signature and message digest with metadata that includes at least one of usage limitations, attributes associated with the sender, identifiers associated with policy, and identifiers associated with the signature.

16. The method of claim 13, wherein supplying further includes supplying the signature and message digest as a Security Assertion Markup Language (SAML) assertion.

17. The method of claim 13 further comprising, receiving the signature and the message digest from a recipient that the sender sent the content to and verifying the signature for the recipient to authenticate the content.

18. The method of claim 13, receiving the signature and the message digest from a different identity service on behalf of a recipient that the sender sent the content to and verifying the signature on behalf of the different identity service.

19. A computer-implemented system to be processed by one or more computers, comprising:
an Authorship Attestation Certificate (AAC) implemented in a computer-readable medium; and
an identity service implemented in a computer-readable medium and to be processed by a computer, wherein the identity service is to create the AAC on behalf of a sender of content in response to a message digest for that content, and wherein the AAC is a signed copy of the message digest, signed by the identity service on behalf of the sender with a signature of the identity service and the signature is used by the sender to attest that the content originates from the sender, and wherein the identity service is to supply the AAC back to the sender.

20. The system of claim 19, wherein the identity service augments the AAC with metadata and the metadata includes at least one of references to the identity service, attributes of the sender and usage limitations with respect to the content.

21. The system of claim 19, wherein the AAC is supplied by the identity service to the sender as an assertion, and the assertion is relied upon by one or more recipients for purposes of authenticating the content.

22. The system of claim 19, wherein the AAC and content are to be supplied by the sender to one or more recipients as at least one of an electronic mail (email) message, an instant message (IM), and a text message.

23. The system of claim 19, wherein the identity service is to subsequently verify the signature of the AAC on behalf of one or more recipients.

24. The system of claim 19, wherein the identity service is to subsequently verify the signature of the AAC on behalf of one or more different identity services communicating with one or more recipients.

25. The system of claim 19, wherein the AAC is to be tagged with the content of a message within at least one of a Multipurpose Internet Mail Extensions (MIME) protocol, Secure MIME (S/MIME) protocol, Really Simple Syndication (RSS) protocol, Transmission Control Protocol (TCP), Extensible Markup Language (XML), and Standard Generalized Markup Language (SGML).

\* \* \* \* \*

UNITED STATES PATENT AND TRADEMARK OFFICE
CERTIFICATE OF CORRECTION

PATENT NO. : 7,574,479 B2  Page 1 of 1
APPLICATION NO. : 11/338393
DATED : August 11, 2009
INVENTOR(S) : Morris et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Seventh Day of September, 2010

David J. Kappos
*Director of the United States Patent and Trademark Office*